Patented Nov. 5, 1935

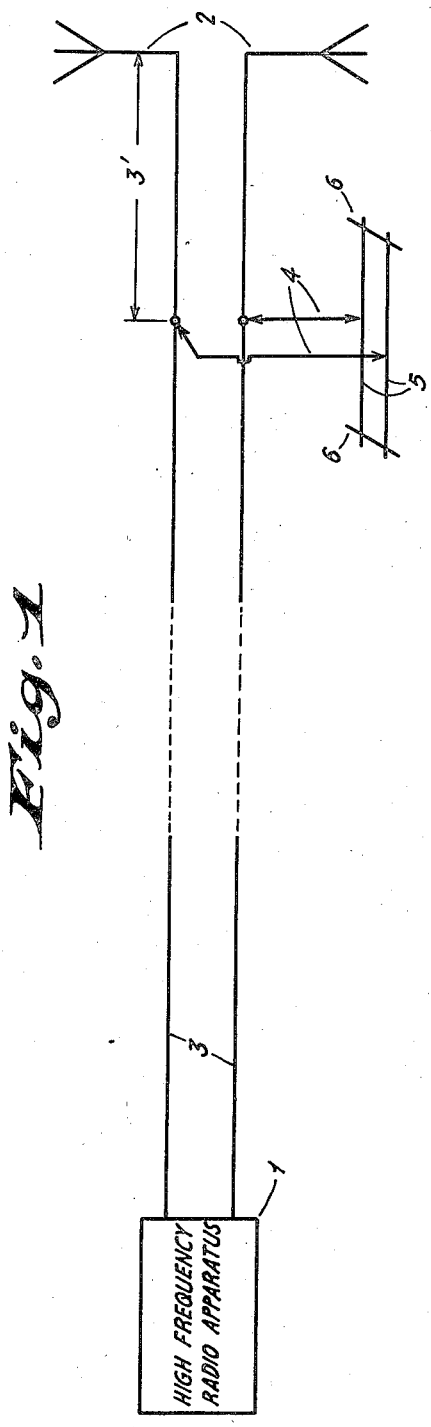

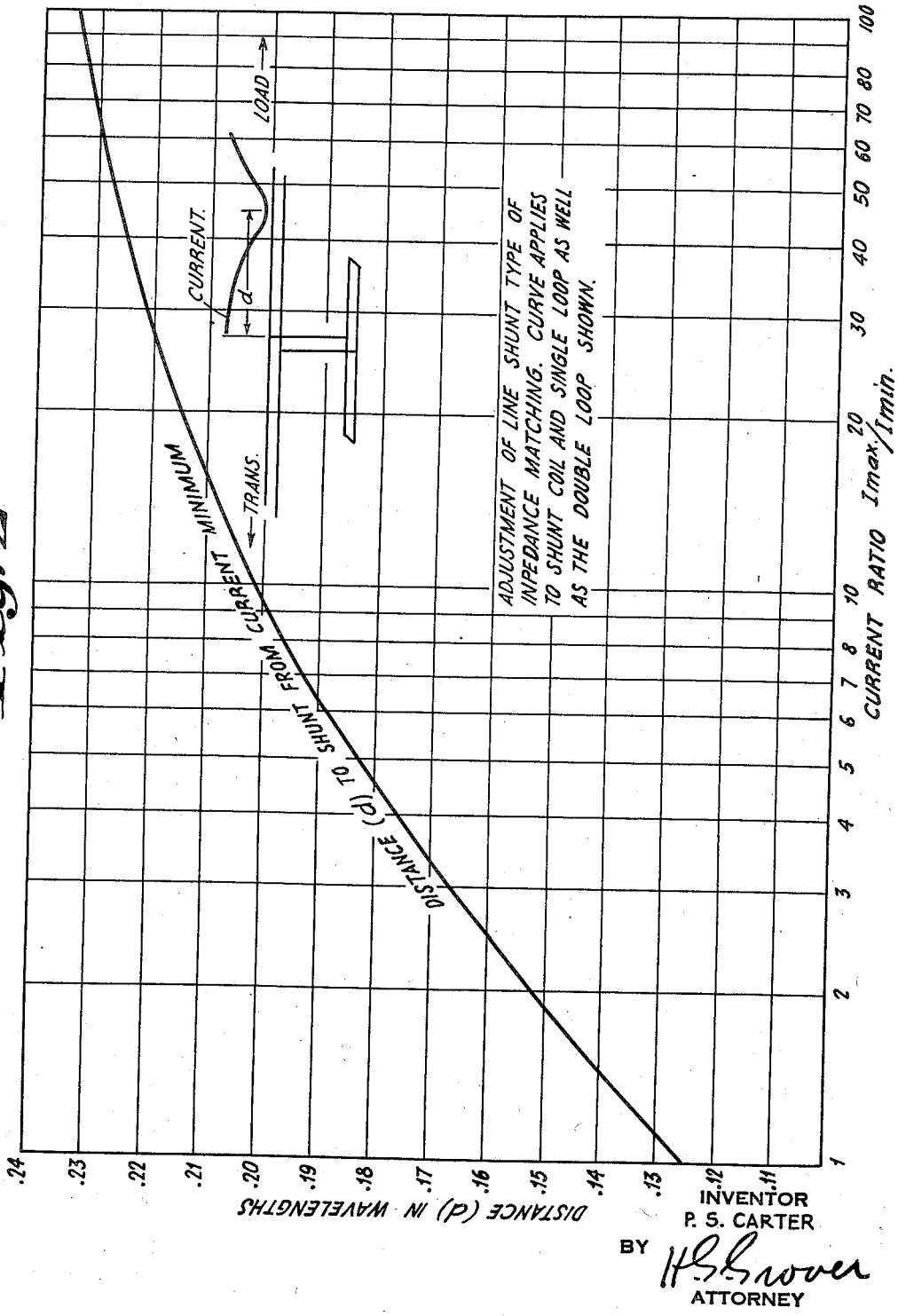

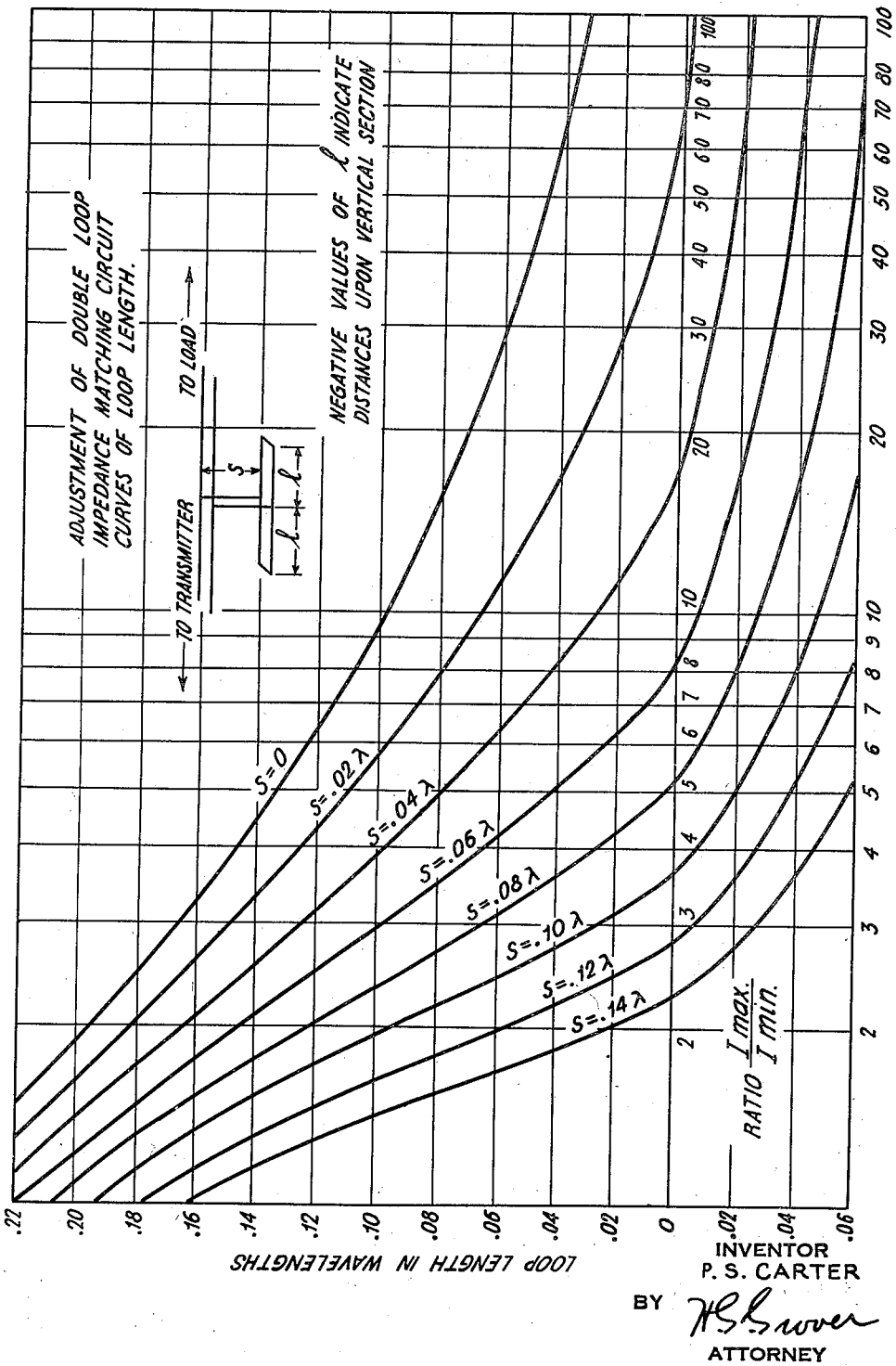

2,019,809

UNITED STATES PATENT OFFICE 2,019,809

TRANSMISSION LINE CIRCUIT

Philip S. Carter, Port Jefferson, N. Y., assignor to Radio Corporation of America, a corporation of Delaware Application April 28, 1934, Serial No. 722,857

4 Claims. (Cl. 178—44)

This invention relates to high frequency transmission line circuits, and particularly to an improved arrangement for adjusting said circuits to a high frequency load circuit, for example, an antenna.

In order that a transmission line should transmit energy at best efficiency, that is to say without reflection, it is known to be desirable to terminate the line with a load which equals in impedance the surge impedance of the line. Since lines and loads are independently designed, or, as often occurs, that existing lines must be connected with existing loads which do not have the requisite values of impedance for best energy transfer over the lines, I have heretofore disclosed in my United States Patent No. 1,909,610, granted May 16, 1933, a method of terminating the line to which a load is connected so that the termination means combined with the load presents the correct impedance to the line. More specifically, I have proposed accomplishing this by connecting a variable reactance across the line at a distance away from the load such that the circuit formed thereby including the variable reactance, the line portion between it and the load, and the load, presents an impedance equivalent to the surge impedance of the line.

A load having a reactive component is always equivalent to a pure resistance load located at a current maximum or minimum position, the equivalent value being lower than the surge impedance at a current maximum or higher than the surge impedance at a current minimum. For this reason the location of the shunt reactance for a pure resistance load is accurate, if, for any load, the distances are measured from a current maximum or minimum position. The mathematical relations giving the exact distances and value of shunt reactance for any equivalent resistance appear later herein.

The present invention is an improvement on the adjusting arrangement disclosed above and provides a more efficient and convenient manner of adjusting the transmission line to a high frequency load. Essentially, the invention consists in the provision of a double line loop in shunt of the transmission line instead of the hereinabove proposed reactance, it being found that the construction of the loop is very simple and, in many cases, its use preferable to that of the coil. By means of this loop, certain mechanical difficulties which have been hitherto encountered during adjustment of the transmission line have been overcome.

The invention is disclosed in more detail in the following description which is accompanied by drawings, Figure 1 of which shows the application of the invention to a radio communication circuit merely by way of example only. Figures 2 and 3 show graphs giving the exact relations employed in obtaining the proper adjustment of the circuit.

Referring to Figure 1 of the drawing, box 1 shows, conventionally, a high frequency radio transmitter, this transmitter being illustrative of any source of alternating current energy, feeding power to an antenna 2, the antenna being illustrative of any load impedance, through the intermediary of a transmission line 3. In order that energy may be conveyed at maximum efficiency along the line 3 the surge impedance of line 3 should be equal in value to the impedance of the load. In practice, as already indicated, it rarely occurs that the load has a correct impedance value so as to match the surge impedance of the line to which it is connected. In order to properly match the load and line, I have previously disclosed in my above-mentioned patent that there should be connected across the line at a suitable distance away from the load a variable reactance of such a value that at a particular distance away from the load 2, the reactance, the load 2 and the portion 3' of the line 3 included therebetween equal in value the surge impedance of the line, thereby allowing a most efficient energy transfer from source 1 along the line 3 to the load 2. Since the principles underlying the manner of connecting this reactance to the load are adequately described in my above-mentioned patent, and form no part of the present invention per se, they will not be described herein.

In the present invention the shunt reactance consists of two short circuited lines 5 which are in parallel with respect to line 4 and act as a load on a single line section, the adjustment of the lengths of lines 5 being made by variable sliding end connections 6, and the adjustment of line 4 on line 5 and on transmission line 3 being accomplished through adjustable sliding points which may take any desired form.

It may be shown that the distance $d$ from a current minimum position is given by $$d=\frac{1}{2m}\cos^{-1}(-K)$$

where $K$ is the reflection factor, and $m=2\pi/\lambda$. The shunt impedance $X_s$ required for matching is then given by:

$$X_s=-Z_0\frac{1+K^2+2K\cos md}{2K\sin md}=\pm\frac{Z_0}{2}\frac{\sqrt{1-K^2}}{K}$$

where $Z_0$ is the surge impedance of the line, the sign being positive when $$\frac{\lambda}{8}<d<\frac{\lambda}{4}$$

and negative when $$\frac{\lambda}{4}<d<\frac{\lambda}{2}$$

It only remains to determine the length $L$ of two closed lines in parallel which, when connected to a single line of length $S$, will result in a reactance $X$.

The input impedance $Z_1$ of any line of length $\chi$ is:

$$Z_i=Z_0\frac{\epsilon^{imx}+K\epsilon^{-imx}}{\epsilon^{imx}-K\epsilon^{-imx}}=Z_0\frac{\epsilon^{imx}+K\epsilon^{-i(mx-\psi)}}{\epsilon^{imx}-K\epsilon^{-i(mx-\psi)}}=Z_0\frac{1+K\epsilon^{-i(2mx-\psi)}}{1-K\epsilon^{-i(2mx-\psi)}}$$

where $$m=\frac{2\pi}{\lambda},\ j=\sqrt{-1},\ K=K\epsilon^{i\psi}=$$

the complex reflection factor. For a closed line $$K=1\epsilon^{i\pi}=-1$$

and the input impedance $Z_l$ of one loop is therefore:

$$Z_l=Z_0\frac{1-\epsilon^{-iml}}{1+\epsilon^{-iml}}=jZ_0\tan ml$$

The impedance $Z_{l2}$ of the two loops in parallel is therefore:

$$Z_{l2}=j\frac{Z_0}{2}\tan ml=jX_{l_2}$$

The reflection factor $K_x$ for a line loaded with a reactance is:

$$K_\chi=\frac{jx-Z_0}{jx+Z_0}=-1\epsilon^{-i2\phi}\text{ where }\theta=\tan^{-1}\frac{X}{Z_0}$$

The input impedance $Z_i$ of the section $S$ with its load of two loops is therefore:

$$Z_i=Z_0\frac{1-\epsilon^{-i(2ms+2m\phi)}}{1+\epsilon^{-i(2ms+2m\phi)}}=jZ_0\tan(ms+m\phi)$$

$$=jZ_0\tan[ms+\tan^{-1}(\tfrac{1}{2}\tan ml)]$$

$$=jZ_0\frac{\tan ms+\tfrac{1}{2}\tan ml}{1-\tfrac{1}{2}\tan ms\tan ml}$$

from which:

$$\tan ml=\frac{2\left[\frac{X_i}{Z_0}-\tan ms\right]}{1+\frac{X_i}{Z_0}\tan ms}=\frac{2\left[\frac{\sqrt{R}}{R-1}-\tan ms\right]}{1+\frac{\sqrt{R}}{R-1}\tan ms}$$

where $R$ is the ratio of maximum to minimum current on the line. The values of $l$ may be determined from this expression for any length of vertical section $S$ which in the drawings is designated by the reference character $4$.

Figures 2 and 3 illustrate graphs obtained from the relations just set forth and show the exact relations used in adjusting the circuits of the invention. In other words, Figures 2 and 3 show the dimensions of the improved impedance matching circuit for various ratios of current maximum to current minimum values. To use these curves it is only necessary to find the position on the line where the current is a minimum, or a maximum, and obtain the ratio of the values of the maximum current to the minimum current in the line. Since these are considered to be self-explanatory, they will not be discussed herein.

From the foregoing it will be readily appreciated that the double loop may approximate either a capacity or an inductance dependent upon the distance of the point of junction of vertical section 4 from the loop.

What is claimed is:

1. In combination, a source of energy, a load, a transmission line extending between said source of energy and said load, means for matching said load to the surge impedance of said line comprising a reactance connected across said line between said load and said source and so arranged that a portion of said line is located between said reactance and load, said reactance comprising a double line loop circuit substantially parallel to said transmission line, said double line loop being closed at both ends and between which ends another line is adjustably connected and extends to the transmission line, said double line loop and other line having such value that the combination only of the load, portion of the transmission line, other line, and the double line loop becomes equivalent to the surge impedance of said transmission line.

2. In combination, a source of energy, a load, a transmission line extending between said source of energy and said load, means for matching said load to the surge impedance of said line comprising a reactance connected across said line between said load and said source and so arranged that a portion of said line is located between said reactance and said load, said reactance comprising a loop circuit consisting of a plurality of linear wires substantially parallel to said transmission line, and means for varying the length of said wires, said reactance having such value that the combination only of the load, portion of the line, and the reactance becomes equivalent to the surge impedance of said transmission line.

3. In combination, a source of energy, a load, a transmission line extending between said source of energy and said load, means for matching said load to the surge impedance of said line comprising a reactance connected across said line between said load and said source and so arranged that a portion of said line is located between said reactance and said load, said reactance comprising a double line loop circuit consisting of a pair of linear wires, said pair being horizontal and short circuited at both of its ends, and another pair of vertical wires extending between points intermediate the ends of said horizontal wires and the transmission line, said pair of vertical wires being adjustable with respect to said horizontal wires and transmission line, said reactance having such value that the combination only of the load, portion of the line, and the reactance becomes equivalent to the surge impedance of said transmission line.

4. In combination, a source of energy, a load, a transmission line extending between said source of energy and said load, means for matching said load to the surge impedance of said line comprising a reactance connected across said line between said load and said source and so arranged that a portion of said line is located between said reactance and said load, said reactance comprising a short circuited wire loop circuit which is substantially parallel to said transmission line and having means for varying its position along said transmission line, said reactance having such value that the combination only of the load, portion of the line, and the reactance becomes equivalent to the surge impedance of said transmission line.

PHILIP S. CARTER.